United States Patent [19]
Sumiyoshi et al.

[11] Patent Number: 5,285,221
[45] Date of Patent: Feb. 8, 1994

[54] COLOR IMAGE ELECTROPHOTOGRAPHIC APPARATUS HAVING PHOTOSENSITIVE BODY AND INTERMEDIATE TRANSFER BODY

[75] Inventors: Michio Sumiyoshi; Akira Sasaki; Isamu Terashima; Hiroyuki Tadokoro, all of Hitachi, Japan

[73] Assignee: Hitachi, Ltd., Tokyo, Japan

[21] Appl. No.: 869,186

[22] Filed: Apr. 16, 1992

[30] Foreign Application Priority Data
Apr. 18, 1991 [JP] Japan .................. 3-086531

[51] Int. Cl.$^5$ .................. G03G 15/01; G01D 9/42; G01D 15/14
[52] U.S. Cl. .................. 346/157; 346/108; 346/160
[58] Field of Search .................. 346/157, 108, 160

[56] References Cited

U.S. PATENT DOCUMENTS

| | | | |
|---|---|---|---|
| 4,257,053 | 3/1981 | Gilbreath | 346/108 |
| 5,055,886 | 10/1991 | Nakatani et al. | 346/157 X |
| 5,151,717 | 9/1992 | Jamzadeh et al. | 346/157 |
| 5,168,290 | 12/1992 | Tanaka et al. | 346/157 X |

Primary Examiner—George H. Miller, Jr.
Attorney, Agent, or Firm—Antonelli, Terry, Stout & Kraus

[57] ABSTRACT

An outer peripheral length of an intermediate transfer drum of a color laser beam printer is constituted in which a number of a beam detection signal obtained by one rotation of the transfer drum is formed as an integral number of a face number of a polygon mirror. A passing-through detection means detects the passing-through of a specified position mark on a photosensitive body belt and is provided on the photosensitive body drum at predetermined position. An image data requirement signal generating means controls a generating timing of an image data requirement signal for forming a toner image by the passing-through detection signal. A scanning line at a raster direction based on the beam detection signal after the transfer drum has rotated at one rotation returns and overlapped on a scanning line position formed on the first beam detection signal as a standard. A plural toner images having a different color each are formed on the transfer drum without color offset.

9 Claims, 6 Drawing Sheets

COLOR IMAGE ELECTROPHOTOGRAPHIC APPARATUS HAVING PHOTOSENSITIVE BODY AND INTERMEDIATE TRANSFER BODY

BACKGROUND OF THE INVENTION

The present invention relates to a color image electrophotographic apparatus having a photosensitive drum and an intermediate transfer body and more particularly to a color image electrophotographic apparatus such as a color laser beam printer having a photosensitive drum and an intermediate transfer body in which the color image can be obtained in accordance with the form by overlapping the different color images on the intermediate transfer body.

The present invention relates to a color laser beam printer having a photosensitive body belt and an intermediate transfer body in which the photosensitive body belt has at least one joint portion.

In the color laser beam printer using an electronic-photography technique, the color image is formed by overlapping the different color images. In this color laser beam printer, it causes an important problem about the color offset between one color and another color.

In the color laser beam printer including a photosensitive body and an intermediate transfer body, first of all the laser beam modulates with an image data of a first color and exposes against the photosensitive body and a latent image is formed on the photosensitive body.

In the present invention, the first place color indicates a color which is requested firstly for forming the color image from a host (an image data generating means) and the second place color indicates a color which is requested at second for forming the color image from the host and so on. In other words, the first color indicates the first place color data which is sent firstly from the host and the second place color indicates a second color data which is sent secondary from the host.

The latent image is developed by a development means of the first color and the toner image is obtained. Such an obtained toner image is transferred or shifted on the intermediate transfer body. In secession, the latent image of the second color is formed on the surface of the photosensitive body using the similar method stated above for forming the first place color and the latent image of the second place color is developed means of the second color and the toner image is obtained.

Such an obtained toner image of the second color is overlapped or transferred on the toner image of the first place color of the intermediate transfer body. Thereby, the color image can be formed on the intermediate transfer body. As occasion demands, the toner image of a third place color and the toner image of a fourth place color are overlapped or transferred on the intermediate transfer body and the respective color image is formed on the intermediate transfer body.

After that the color image is overlapped or transferred collectively on a printing paper which is sent by a printing paper transportation means and the color image can be obtained. Accordingly, it becomes an important problem about a color match on the intermediate transfer body.

Taking measurement to meet the above stated problem, the following countermeasures have been proposed.

For the improvement of the color match, in a conventional color laser beam printer, for example disclosed in Japanese Patent Laid-Open No. 195687/1987, a photosensitive body and a transfer body are driven at a constant speed by synchronizing a basic clock signal and an exposure timing and a transfer timing of each color are carried out using the above stated basic clock signal.

Further, for the improvement of the color match, in another color laser beam printer, for example disclosed in Japanese Utility Model Laid-Open 155147/1988, a control means comprises a pulse from an encoder installed on a drive motor as the printing paper transportation means and a pulse from a sensor installed on a midway of a printing paper transportation passage. In this prior art, an exposure timing and a transfer timing of each color are carried out using the above stated pulse signal.

However, with the above stated control means provided on the conventional color laser beam printer, in a case of the color laser beam printer disclosed Japanese Patent Laid-Open No. 195687/1987 (the former prior art), there is not considered fully about the exposure start timing control for each color of the image data. Accordingly, it is difficult to form the toner image for each color at an accurate position, as a result it causes the color offset.

Besides, in the color laser beam printer disclosed in Japanese Utility Model Laid-Open 155147/1988 (the latter prior art), since the transportation position of the printing paper is detected indirectly, the change in the mechanical relationship between the encoder and the printing paper transportation means, especially the peripheral length of the belt type transportation means changes according to the environment change in the temperature and the humidity, the aged deterioration and the exchange by the maintenance etc., accordingly as a result there causes a problem about the color offset.

Further, in a case that the belt member is employed as the photosensitive body, as the belt member to be used it is desirable to employ the endless type belt. However, from the aspect of the cost in manufacturing, it is used frequently the belt member for the photosensitive body having the joint portion in comparison with the endless type belt.

In the case of the belt member for the photosensitive body having the joint portion, since at the joint portion the electrostatic latent image is not formed thereon, it is necessary to manage the joint portion of the belt member for the photosensitive body.

FIG. 8 is a control timing chart showing the conventional color laser beam printer structure. The control timings are an exposure timing and a transfer timing of each color. In this conventional color laser beam printer, the printing processing is carried out according to a certain fixed timing.

FIG. 8 shows the relationships between the joint portion position of the photosensitive body, an intermediate transfer drum (an intermediate transfer body) sensor signal and a vertical synchronizing signal (VSYNC-N 30).

For example, after the fixed time tm as the standard of the signal of one printing paper sensor, when the printing is controlled so as to send the vertical synchronizing signal (VSYNC-N 30) as an image data requirement signal to the image data generating means as the host, the joint portion position of the photosensitive body belt is slipped every time of the rotation.

As shown a point (p) in FIG. 8, some time the joint portion of the photosensitive body drum may enter into the image area of the intermediate transfer body.

SUMMARY OF THE INVENTION

An object of the present invention is to provide a color image electrophotographic apparatus such as a color laser beam printer wherein a good image can be obtained.

Another object of the present invention is to provide a color image electrophotographic apparatus such as a color laser beam printer wherein a plural toner images having different color each can be prepared on an intermediate transfer body without the color offset.

A further object of the present invention is to provide a color image electrophotographic apparatus such as a color laser beam printer wherein the toner image can be prepared on an intermediate transfer body by controlling a position of a joint portion of a photosensitive body belt having a joint portion not so as to enter into an image portion of the intermediate transfer body.

A further object of the present invention is to provide a color image electrophotographic apparatus such as a color laser beam printer wherein the toner image can be prepared on an intermediate transfer body by controlling a position of a joint portion of a photosensitive body belt having a joint portion not so as to overlap on an image portion of the intermediate transfer body.

According to the present invention, the joint portion of the photosensitive body belt does not enter into the position of the image on the intermediate transfer drum, the positioning of every each color can be carried out accurately on the intermediate transfer body, as a result the color image having the color having no offset can be obtained.

In accordance with the present invention, a color image electrophotographic apparatus having a photosensitive body and an intermediate transfer body comprises: an image data generating means for generating an image data as a video signal; a control means for lighting on or lighting off a laser beam which is modulated according to the video signal generated from the image data generating means; an exposure means for deflecting and scanning the laser beam toward a width direction of a recording medium by a rotary polygon mirror; a light detection means for generating a printing synchronizing signal by detecting the scanning laser beam which passes through a predetermined position; a photosensitive body in which an electrostatic latent image is formed by exposing the exposure means; a set of development means for forming a toner image on a surface of the photosensitive body by developing the electrostatic latent image formed on the photosensitive body; a recording medium transporting means for transporting the recording medium; an intermediate transfer body for transferring once the toner image; and a control means for controlling each of the above stated means, the control means controls the above stated means in which by repeatedly rotating a plural time the photosensitive body and by controlling the exposure means in accordance with the image data given by the image data generating means the electrostatic latent image for forming repeatedly the toner image having a different color each on the photosensitive body, the toner image having the different color is formed according to developing the electrostatic latent image, the toner image is repeatedly transferred on the intermediate transfer body, a color image is formed on the intermediate transfer body, and after that the color image is transferred collectively on the recording medium.

The color image electrophotographic apparatus comprises further: a passing-through detection means for detecting a specific portion of the photosensitive body; and an image data requirement signal generating means for controlling a generating timing of an image requirement signal for forming the toner image, and wherein an outer peripheral length of the intermediate transfer body is constituted in which a number of a printing synchronizing signal is formed as an integral number of a face number of the rotary polygon mirror, the passing-through detection means is provided at a predetermined position on the photosensitive body, and the image data requirement signal generating means controls the generating timing of the image requirement signal in accordance with a passing-through detection signal obtained by the passing-through detection signal.

According to the present invention, a color laser beam printing apparatus having a photosensitive body belt and an intermediate transfer drum comprises a passing-through detection means for detecting a specific portion of the photosensitive body belt; and an image data requirement signal generating means for controlling a generating timing of an image requirement signal for forming the toner image, and further an outer peripheral length of the intermediate transfer drum is constituted in which a number of a printing synchronizing signal is formed as an integral number of a face number of a rotary polygon mirror, the passing-through detection means is provided at a predetermined position on the photosensitive body belt, and the image data requirement signal generating means controls the generating timing of the image requirement signal in accordance with a passing-through detection signal obtained by the passing-through detection signal.

In the present invention, the pass through detecting means detects a position mark of a specified portion of the photosensitive body belt, such as a vicinity of a front side of the joint portion of the photosensitive body belt.

Further, in the present invention, since when the intermediate transfer body rotates at one rotation and since the rotary polygon mirror rotates at integer rotations a scanning line of a raster direction, which writes BDT signal (beam detection signal) after the intermediate transfer body as a standard, returns and overlaps a scanning line position which forms the first time BDT signal (beam detection signal).

Accordingly, when an image data requirement signal of the first place color is generated, according to a management of BDT signal (beam detection signal) number from the time in which the image data requirement signal of the first place color an image data requirement signal of N color can generate the image data requirement signal of N color which is carried out an acute positioning alignment with the write-out position of the first place color.

Accordingly, each color can be prepared on the intermediate transfer body without an offset in color, further a good color image can be obtained by avoiding the joint portion of the photosensitive body belt.

DESCRIPTION OF THE INVENTION

One embodiment of a color image electrophotographic apparatus or a color laser beam printing apparatus according to the present invention will be explained referring to drawings.

Figure 1:
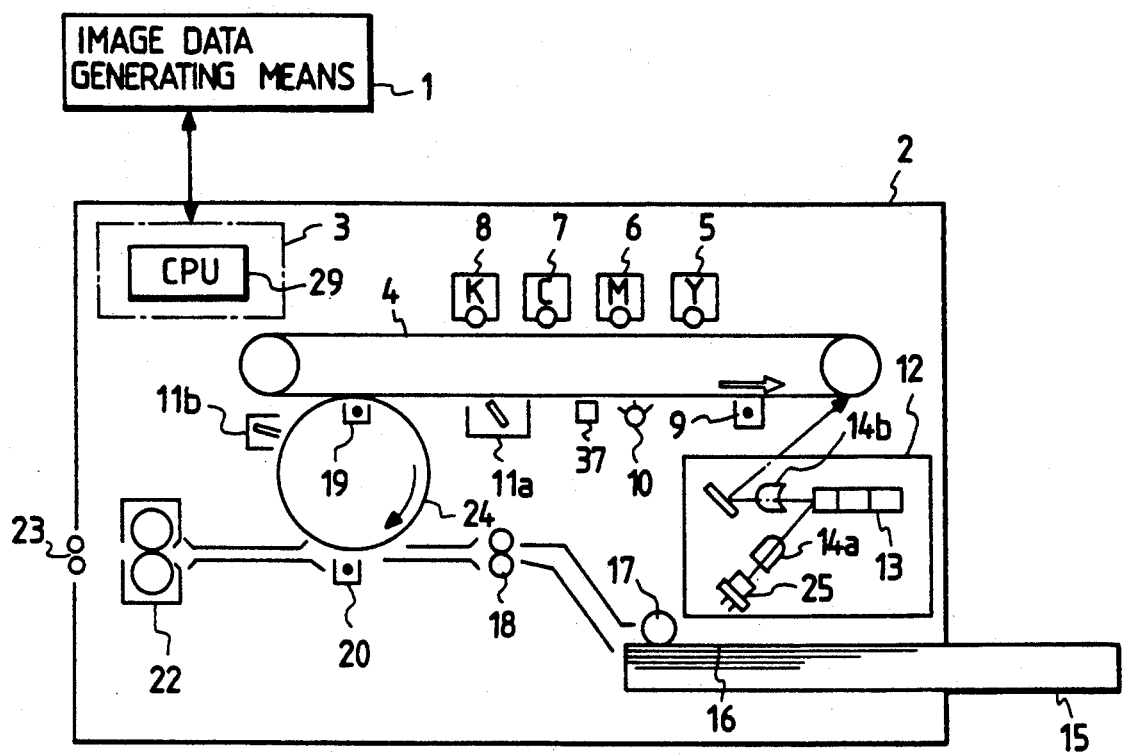
FIG. 1 is a longitudinal schematically cross-sectional a color image electrophotographic apparatus such as a color laser beam printer according to the present invention.

FIG. 1 is a whole schematic construction view showing one embodiment of a color image electrophotographic apparatus or a color laser beam color printing apparatus according to the present invention.

A color laser beam printing apparatus comprises mainly an image data generating means 1 as a host and a color laser beam printer 2 having a controller 3.

The color laser beam printing apparatus has a printing unit. The printing unit of the color laser beam printing apparatus comprises a belt type photosensitive body belt 4 as a photosensitive body, an intermediate transfer drum 24 as an intermediate transfer body, a charger 9, cleaners 11a, 11b and 11c, a development means (Y) 5 for yellow color, a development means (M) 6 for magenta color, a development means (C) 7 for cyan color and a development means (K) for block color 8 etc. Using this printing unit construction, it can carry out the overlapping in color.

The basic motion in the color laser beam printing apparatus according to the present invention is as followings. At first, after the photosensitive body belt 4 has been charged by the charger 9, the electrostatic latent image is prepared by exposing an optical exposure means 12 in accordance with the image data which is sent from the image data generating means 1.

Next, one of each of the development means 5 having toners for yellow color (Y), the development means 6 for magenta color (M), the development means 7 for cyan color (C) and the development means 8 for black color (K) is selected in accordance with the designation of the image data generating means 1 and the development is carried out in respective development means 5, 6, 7 and 8.

In succession, as to next designation the motion carried out repeatedly similar to the above motion. The toner image developed on the surface of the photosensitive body belt 4 is transferred to the intermediate transfer drum 24 one color one by one and the colors are overlapped on the intermediate transfer drum 24.

The development process with all colors of the image data has been finished and by carrying out the final process of the transfer motion on the intermediate transfer drum 24, the color toner image is transferred on a printing paper 16 as a recording medium by attempting the timing which is carried out using a paper feeding roller 17, a resist roller 18 and a transfer means 20 etc. by the controller 3. The toner image is fixed by a fixing means 22 and the printing paper 16 is discharged by a paper discharging mens 23 outside of the color laser beam printing apparatus.

Figure 2:
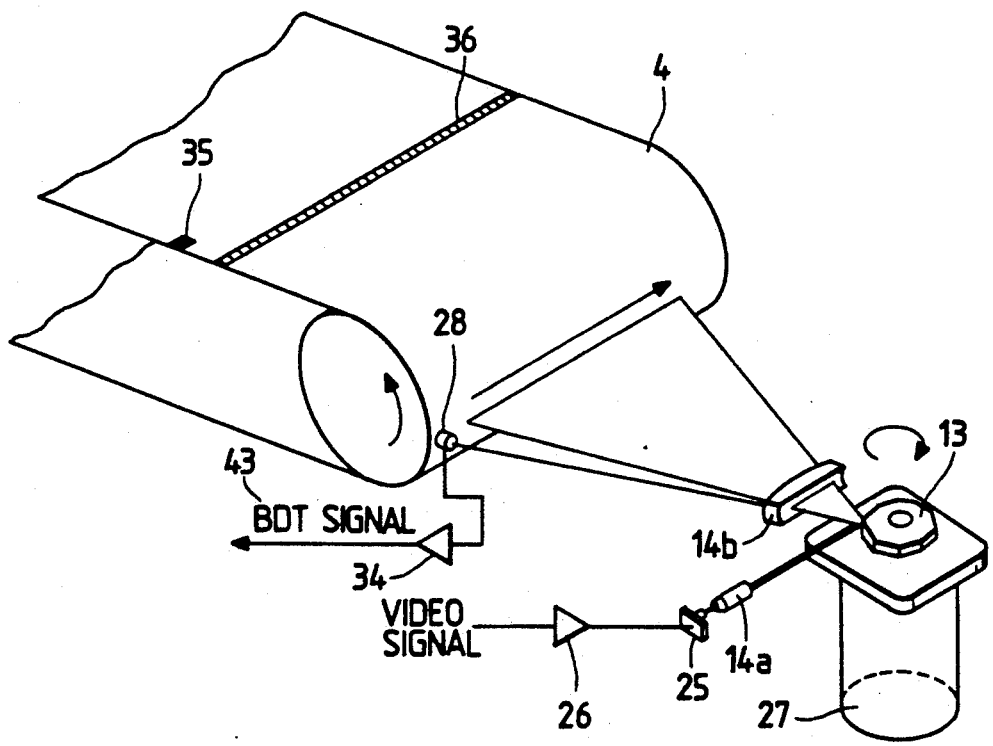
FIG. 2 is an oblique view showing a schematic construction of a laser beam scanning unit of the color laser beam printer shown in FIG. 1 according to the present invention.

FIG. 2 is a schematic construction view showing a laser beam operation unit for forming the electrostatic latent image on the photosensitive body belt 4.

In this figure, after the video signal from the image data generating means 1 for generating the data to be printed has been amplified by a video amplifier 26, the amplified video signal drives a laser diode 25. The laser beam emitted from the laser diode 25 is shaped by a combination lens 14a and reflected by a polygon mirror 13 which rotates at high speed by a scanner motor 27.

The laser beam passes through f-$\theta$ lens 14b, scans at constant speed on the photosensitive body belt 4 and prepares the image data on the surface of the photosensitive body belt 4 as the electrostatic latent image.

The above stated image data in the color printer employs the raster scanning system which generates the dot information in synchronized with the deflection scanning (raster) at the horizontal direction and the vertical scanning by the rotation of the photosensitive body belt 4.

The scanning position at the raster direction and the light on-off of the laser beam are synchronized with BDT signal (beam detection signal). This BDT signal is amplified the photo-sensor pulse from a photo-sensor 28 by an amplifier 34 which announces the reach of the laser beam at the write-out position, relating to a light detecting means for generating the print synchronizing signal for announcing the reach of the scanning beam at a predetermined position.

Figure 7:
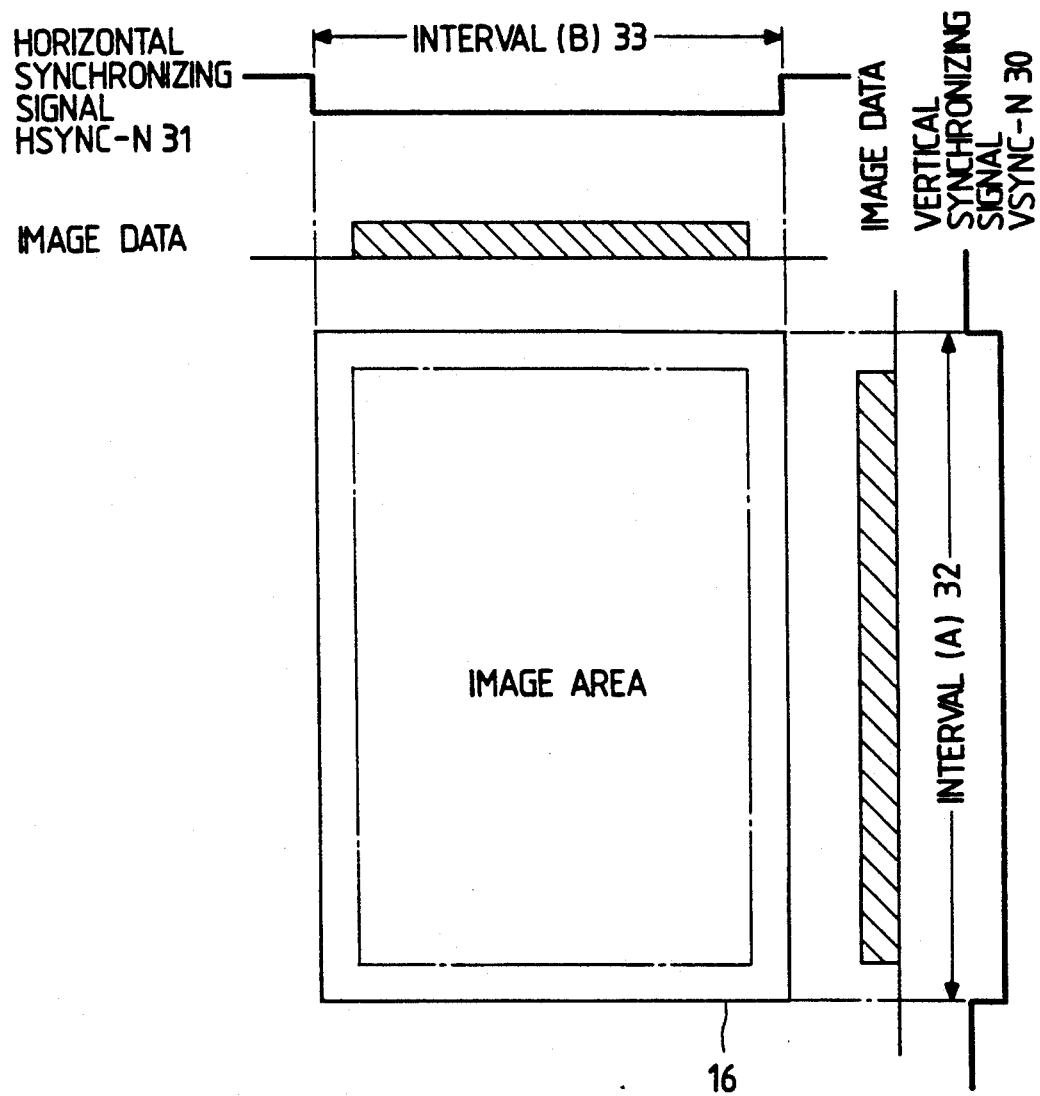
FIG. 7 is an explanatory view showing a relationship between a printing paper and a synchronizing signal of the color laser beam printer according to the present invention.
Figure 8:
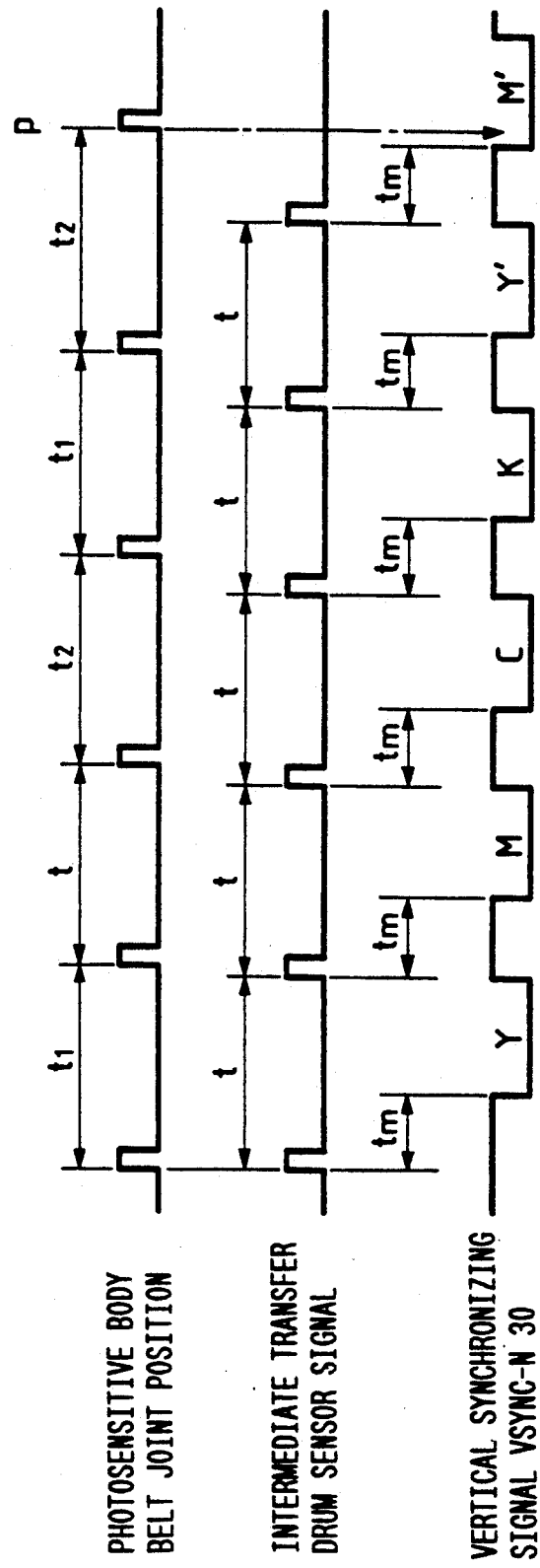
FIG. 8 is a control timing chart of a color laser beam printer according to the prior art.

FIG. 7 is an explanatory view showing a relationship between the image area and the write-out synchronizing signal. The vertical synchronizing signal VSYNC-N 30 at the vertical direction and the horizontal synchronizing signal HSYNC-N 31 at the horizontal direction correspond to the normal image area or correspond to the whole area of the printing paper 16.

In this embodiment of the present invention, it will be explained referring to a case in which the vertical synchronizing signal VSYNC-N 30 and the horizontal synchronizing signal HSYNC-N 31 correspond to the whole region of the printing paper 16.

The valid time width (the interval (A) 32 from the fall time from the rise time) in the vertical synchronizing signal VSYNC-N 30 and the valid time width (the interval (B) 33 from the fall time from the rise time)the horizontal synchronizing signal HSYNC-N 31 differ from the size of the printing paper 16 to the size of the printing paper 16.

In the image data generating means 1, the image data is managed and controlled to send the image data within the valid interval in accordance with the synchronizing signal VSYNC-N 30 and the synchronizing signal HSYNC-N 31 sent from the color laser beam printer 2.

The above process will be explained more detail referring to from FIG. 3 to FIG. 6. As stated above, when the printing requirement is sent from the image data generating means 1, the controller 3 installed in the color laser beam printer 2 carries out a series of printing motions according to CPU 29.

The color laser beam printer 2 modulates the laser diode 25 in accordance with the image data of each color which is sent from the image data generating means 1. The optical exposure means 12 including the rotary polygon mirror 13 deflects the light beam output from the laser diode 25 and the light scans and exposes on the surface of the photosensitive body belt 4.

Figure 3:
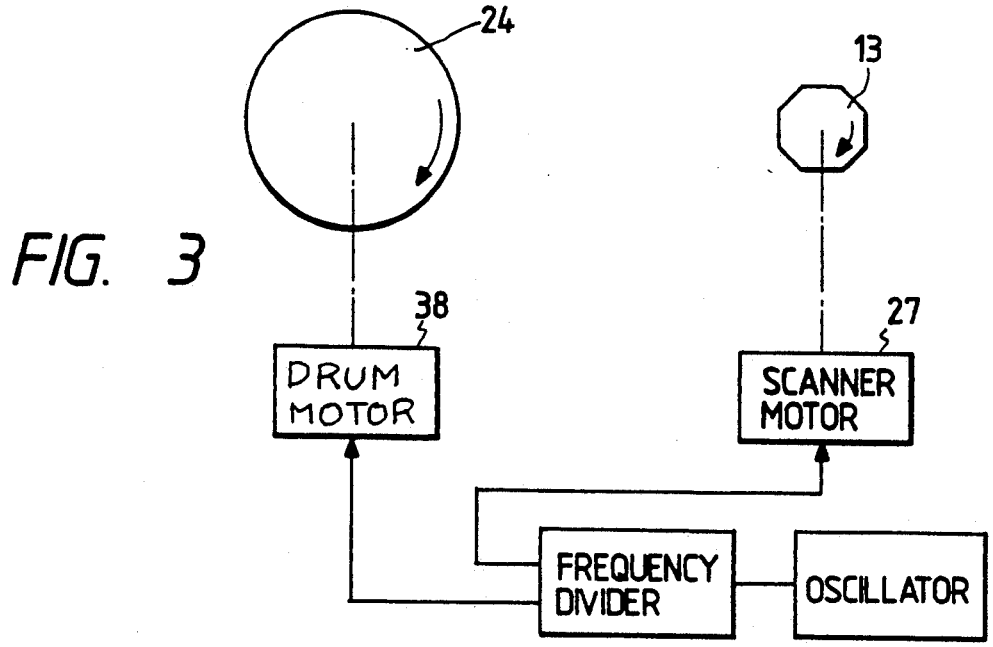
FIG. 3 is a diagram showing a motor drive construction of the color laser beam printer according to the present invention.

The photosensitive body belt 4 is rotated at the constant speed in a direction shown in FIG. 3 and the surface of the photosensitive body belt 4 is charged uniformly in advance by the charger 9 and thereby the electrostatic latent image is prepared by the exposure and scanning. Each of the development means 5, 6, 7 and 8 develops the electrostatic latent image and prepares the toner image. The toner image on the photosensitive body belt 4 is transferred to the intermediate transfer drum 24 by a transfer means 19.

In the case of the full color printing, the similar operation is carried out each of the color as yellow (Y), the magenta (M) the cyan (C) and the black (K) and after the colors have been overlapped on the intermediate transfer drum 24, the toner image is transferred at once on the printing paper 16 sent from the printing paper transportation means by the transfer means 20. After that, the toner image is fixed by the fixing means 22 and the printing paper 16 is discharged by the paper discharging roller 23 outside of the color laser beam printing apparatus.

A position detection mark 35 for detecting the position of the rotation direction for the photosensitive body belt 4 is provided on at a predetermined position of the photosensitive body belt 4. A passage detection means 37 is provided on the opposite side of the position detection mark 35 of the photosensitive body belt 4.

Figure 4A:
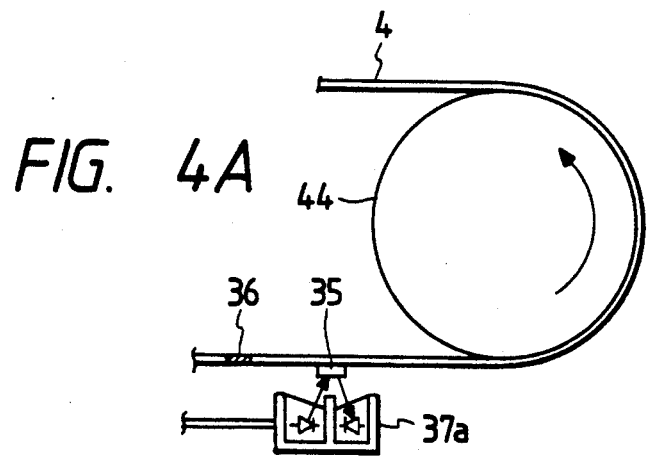
FIG. 4A is a construction view showing one pass detection means of the color laser beam printer according to the present invention.
Figure 4B:
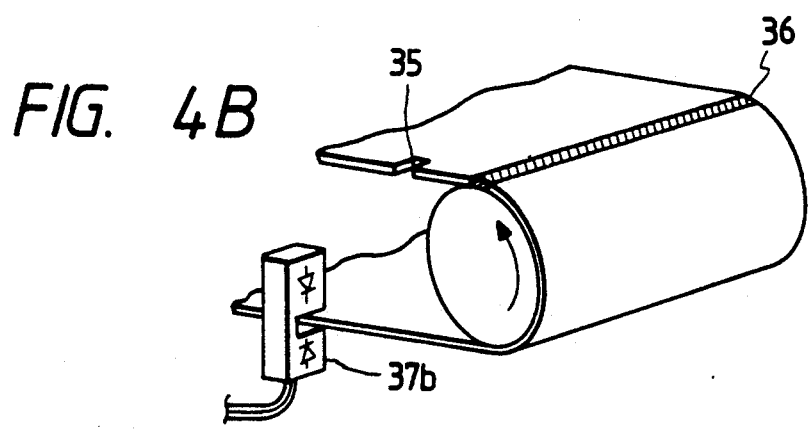
FIG. 4B is a construction view showing another pass detection means of the color laser beam printer according to the present invention.

The above construction is shown in FIG. 4A and/or FIG. 4B. FIG. 4A is a construction view showing the reflection type passage detection means 37a and FIG. 4B is a construction view showing the light shield type passage detection means 37b, respectively. In case of the light shield type passage detection means 37b, the position detection mark 35 may have the notch as shown in FIG. 4B.

In the present invention, it can employ one of these passage detection means 37 which is suitable for the construction of the color laser beam printer 2 and each of the selected passage detection means can obtain the similar effect.

As the photosensitive body belt 4, it is desirable to employ the endless type belt and in this endless type belt construction the notch can provide anywhere of the peripheral portion, however in this embodiment of the present invention as the photosensitive body belt 4 employs the belt type having a joint portion 36 from the aspect of the manufacturing cost.

In this embodiment of the present invention, for the above structure, it is necessary to manage always the joint portion 36 of the photosensitive body belt 4 and the position detection mark 35 of the photosensitive body belt 4 is marked at the short front portion of the joint portion 36 against the rotation direction of the photosensitive body belt 4. The joint position of the joint portion 36 in the photosensitive body belt 4 is known by a passage detection signal 39 which is obtained during passage of the position detection mark 35 of the photosensitive body belt 4.

In this embodiment of the color laser beam printer 2 according to the present invention, the relationship between the peripheral length of the photosensitive body belt 4 and the peripheral length of the intermediate transfer drum 24 is formed to be 2:1.

Further, the peripheral length of the intermediate transfer drum 24 is constructed to longer than the longest length of the longer side of the printing paper 16 which is selected one supported by the color laser beam printer 2. Accordingly, with the above stated construction, it can expose and develop two sheets of the printing paper 16 in one round of the photosensitive body belt 4.

FIG. 3 is an explanatory view showing the relationship for the driving method between the intermediate transfer drum 24 and the rotary polygon mirror 13. As stated above, since the number of BDT signal (beam detection signal) which can be obtained by one rotation of the intermediate transfer drum 24 is the integral multiple of the face number of the rotary polygon mirror 13, as shown in this embodiment when the rotary polygon mirror 13 having eight (8) faces is employed, multiple of eight (8).

Besides, the outer diameter of the intermediate transfer drum 24 is decided to a certain degree under the consideration of the resolution degree of the color laser beam printer 2 to be target, the speed of the printing and the size of the supporting paper etc. In this embodiment, the outer diameter of the intermediate transfer drum 14 is decided under the condition that the number of BDT signal (beam detection signal) has 8960 number when the intermediate transfer drum 24 rotates one rotation number.

Accordingly, when the intermediate transfer drum 24 rotates one rotation number, the rotary polygon mirror 13 rotates exactly 1120 (=8960/8) rotation number. In this time, on the intermediate transfer drum 24 the scanning line of the first scanning of the second rotation time is overlapped over on the raster scanning line which is written by BDT signal (beam detection signal) 43 of the first scanning time of the first rotation time as the standard.

Therefore, the scanning line of the first scanning of the first rotation time and the scanning line of the first scanning of the first rotation time and the second rotation time are overlapped every time of 8960 rotation number of BDT signal (beam detection signal) 43.

Further, the intermediate transfer drum 24 and the rotary polygon mirror 13 are driven by a drum motor 38 and a scanner motor 27 which are constructed to have the voluntary divided frequency number by the same crystal oscillator. Accordingly, the relationship of each phase under the rotation is maintained at constant and the difference in rotation does not cause, as a result each of the rotation position is not varied.

Figure 5:
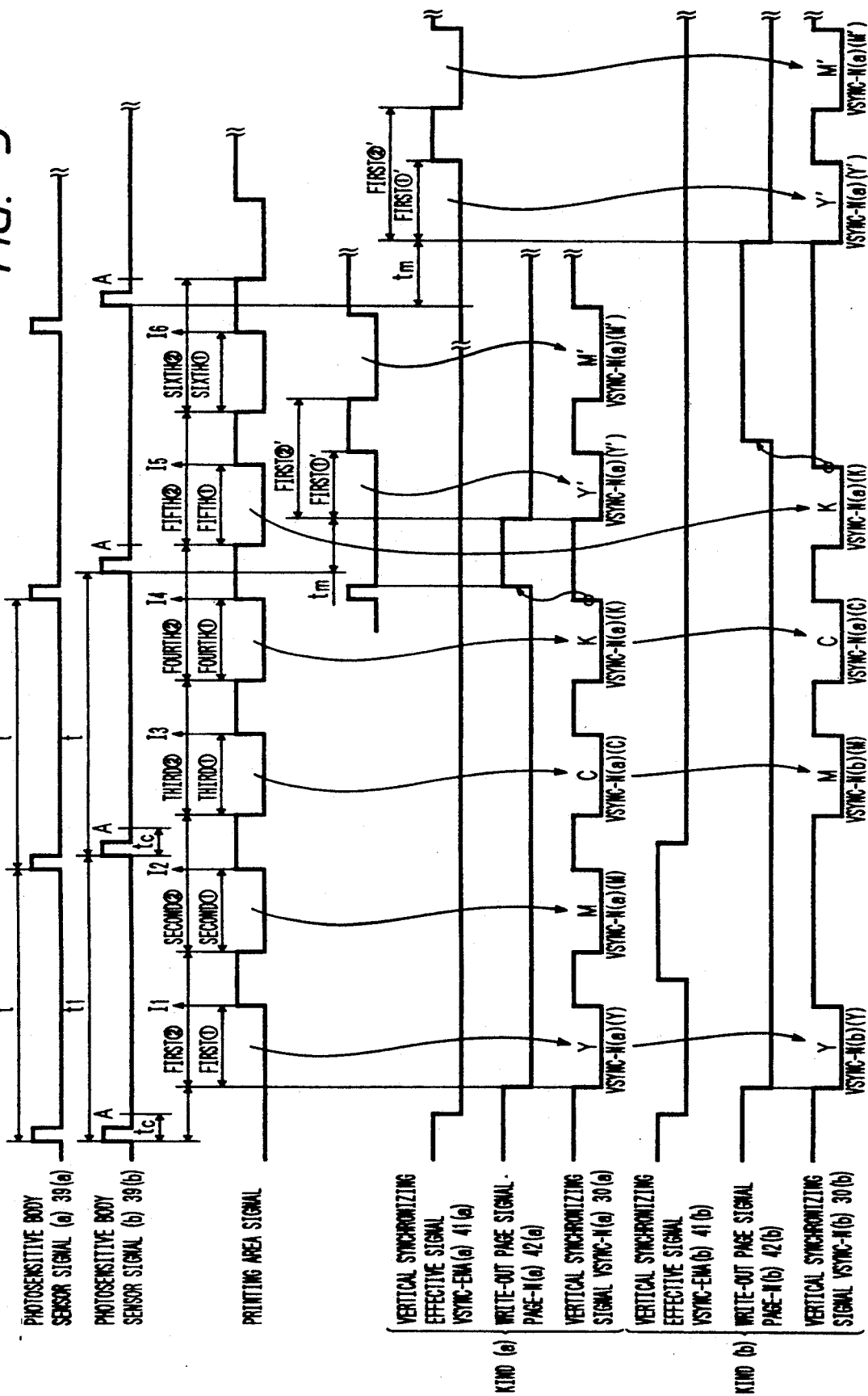
FIG. 5 is a control timing chart of the color laser beam printer according to the present invention.

The control timing of this embodiment of the color laser beam printer 2 according to the present invention will be explained more detail as following. FIG. 5 is a timing chart showing the color laser beam printer 2 according to the present invention.

In this figure, the color laser beam printer 2 carries out the full color printing in which each color of yellow (Y), magenta (M), cyan (C) and black (K) is used respectively. First of all, each of the signal will be explained. A photosensitive body belt sensor signal 39a is output during the following condition.

The conditions are that the peripheral length of the photosensitive body belt 4 does not vary, there exists no slip between the photosensitive body belt 4 and a drive roller 44 and the photosensitive body belt 4 rotates with the rotation period t.

Whereas the above conditions, in actually as shown in the photosensitive body belt sensor signal 39b, there is a case in which the rotation period of the photosensitive body belt 4 may be varied slightly due to the slip caused the photosensitive body belt 4 and the drive roller 44. The inventors of the present invention have been found out the following facts through the experimentation. Namely, this variation amount of the rotation period is almost about 0.2 mm degree at the several ten rotation number of the photosensitive body belt 4.

In FIG. 5, a point (A) of the photosensitive body belt sensor signal 39b indicates the joint portion position of the photosensitive body belt 4 and the time for reaching this joint portion requires time tc.

Further, a printing area signal AREA-N 40 generates repeatedly an area (1) and an area (2) as shown in FIG. 5 with some timing as the trigger. The time control for the area (1) and the area (2) is carried out according to the number of BDT signal (beam detection signal) 43. Since the period of BDT signal (beam detection signal) 43 is a proper value which is decided by the specification of the color laser beam printer 2, the target time can be replaced and managed by the number of BDT signal (beam detection signal) 43.

The area (1) is equivalent to the time for corresponding to the length in the transportation direction of the printing paper 16, in other words the area (1) is equivalent to an interval 32 of the vertical synchronizing signal VSYNC-N 30 of the vertical direction which is the image data requirement signal.

The area (2) is equivalent to one rotation of the intermediate transfer drum 24. A vertical synchronizing valid signal VSYNC-ENA 41 is made effective the vertical synchronizing signal VSYNC-N 30. When the vertical synchronizing valid signal VSYNC-ENA 41 is "Low" level, this signal is made effective the vertical synchronizing signal VSYNC-N 30. This vertical synchronizing valid signal VSYNC-ENA 41 is controlled according to CPU 29 etc.

A write-out page signal PAGE-N 42 generates the signal for generating the printing paper 16 on every other sheet. The write-out page signal PAGE-N 42 is made effectively by the rise at the timing for generating the first page and the first place color of the image data requirement signal. This write-out page signal PAGE-N 42 is controlled according to CPU 29 etc. and the rise timing of this write-out page signal PAGE-N 42 is synchronized with BDT signal (beam detection signal) 43.

Next, the control method using these signals will be explained as followings. In FIG. 5, the kind indicated by (a) shows the case of the usual full color printing. First of all, so as to avoid the joint portion of the photosensitive body belt 4, it is preferable to generate the vertical synchronizing signal VSYNC-N(a) 30(a) of the first color. The vertical synchronizing signal VSYNC-N(a) 30(a) has longer time than the above stated time tc and is generated from the portion separated from the above variation amount.

In this embodiment of the present invention, the time of the vertical synchronizing signal VSYNC-N(a) 30(a) in indicated by the time tm and after the detection of the photosensitive body belt 4 and after the lapse of the time tm, the write-out page signal PAGE-N(a) 42(a) and the In this time, the printing area signal AREA-N 40 is synchronized with the write-out page signal PAGE-N(a) 42(a) and starts the operation, accordingly the area (1) and the area (2) generate repeatedly well-regularly. Since the area (1) of the above stated printing area signal AREA-N 40 indicates the valid section of the vertical synchronizing signal VSYNC-N(a) 30(a), against the image data generating means 1 it can send out the first area (1) as the vertical synchronizing signal VSYNC-N(a)Y 30(a)(Y) for the yellow color (Y).

The point in which the operation of the first area (1) has been finished locates the portion in which the intermediate transfer drum 24 rotates one rotation and returns to the original position. In this embodiment of the present invention, the portion is one after the write-out page signal PAGE-N(a) 42(a) is risen and BDT signal (beam detection signal) 43 is counted 8960 number. Further, this portion is one that the vertical synchronizing signal VSYNC-N(a)Y 30(a)(Y) for the first place color is generated on the intermediate transfer drum 24 and the write-out for the second place color overlaps accurately with the write-out for the first place color.

Subsequently, in similar to the above the second area (1) is sent out the vertical synchronizing signal VSYNC-N(a)M 30(a)(M) for the magenta color (M). As to the cyan color (C) and the black color (B), the vertical synchronizing signal VSYNC-N(a)C 30(a)(C) for the cyan color (C) and the vertical synchronizing signal VSYNC-N(a)B 30(a)(B) for the black color (B) are sent out respectively similar to the above method.

In case of the continuous printing, using the fifth area (1) and the fifth area (2) the synchronizing signals can send out with the similar method, however since the photosensitive body belt 4 rotates two rotations, it seems to cause a slight discrepancy in position. By the above reason, it is necessary to synchronize again with the photosensitive body belt sensor signal (b)39(b) and using the first area (1)' and VSYNC-N(a)Y' 30(a)(Y)' for the yellow color (Y)' of the next page.

In succession, the vertical synchronizing signal VSYNC-N(a)M' 30(a)(M)' for the magenta color (Y)' of the next page, the vertical synchronizing signal VSYNC-N(a)C' 30(a)(C)' for the cyan color (C)' of the next page and the vertical synchronizing signal VSYNC-N(a)K' 30(a)(K)' for the black color (K)' of the next page are send out in sequence.

In this embodiment of the present invention, each of every page, the synchronizing operation is carried out with the photosensitive body belt sensor signal (b)39(b). However, according to the offset amount of the photosensitive body belt 4 it can carried out each of every two pages or each of every three pages and in these cases the similar effects shown in the above case can be obtained.

Further, in FIG. 5, the kind (b) shows the processing in which at the side of the color laser beam printer 2 it is detected that the image data from the image data generating means 1 is not sent due to any cause. There are various methods for the detection, however in general such an information is informed from the image data generating means 1. When the color laser beam printer 2 detects the above stated information, the color laser beam printer 2 corresponds to operate the vertical synchronizing effective signal VSYNC-ENA(b) 41(b).

As stated above, this vertical synchronizing effective signal VSYNC-ENA(b) 41(b) can select whether or not it makes effective the vertical synchronizing signal VSYNC-NA(b) 30(b). When the image data is not sent, the vertical synchronizing signal VSYNC-NA(b) 30(b) is made the non-effective side, for example in this embodiment of the present invention the vertical synchronizing signal VSYNC-NA(b) 30(*b*) is made the high "H" level.

In FIG. 5, it is exemplified the case in which the image data relating to the magenta (M) color is not sent from the image data generating means 1.

In this case, since the printing area signal AREA-N 40 is not received any influence and generates repeatedly the area (1) and the area (2), when the image data generating means 1 becomes to send the image data, the vertical synchronizing effective signal VSYNC-ENA(b) 41(*b*) is made effectively again and then the image data generating means 1 can send the vertical synchronizing signal VSYNC-NA(b) 30(*b*) without offset in the write-out position in the starting point for writing out.

Here, the timing for operating the vertical synchronizing effective signal VSYNC-ENA(b) 41(*b*) is carried out as follows. The interrupt signal I 52 is generated at the rise edge in the finish of the area (1) and this interrupt signal I 52 is input into CPU 29.

In this time, the condition of the image data generating means 1 is searched and according to the results the effective operation or the ineffective operation for the vertical synchronizing effective signal VSYNC-ENA(b) 41(*b*) is carried out. After that, when the processing for one page has been finished similar to the above stated processing, it takes to synchronize with the photosensitive body sensor signal (b) 39(*b*) and the processing for subsequent next page is carried out.

Figure 6:
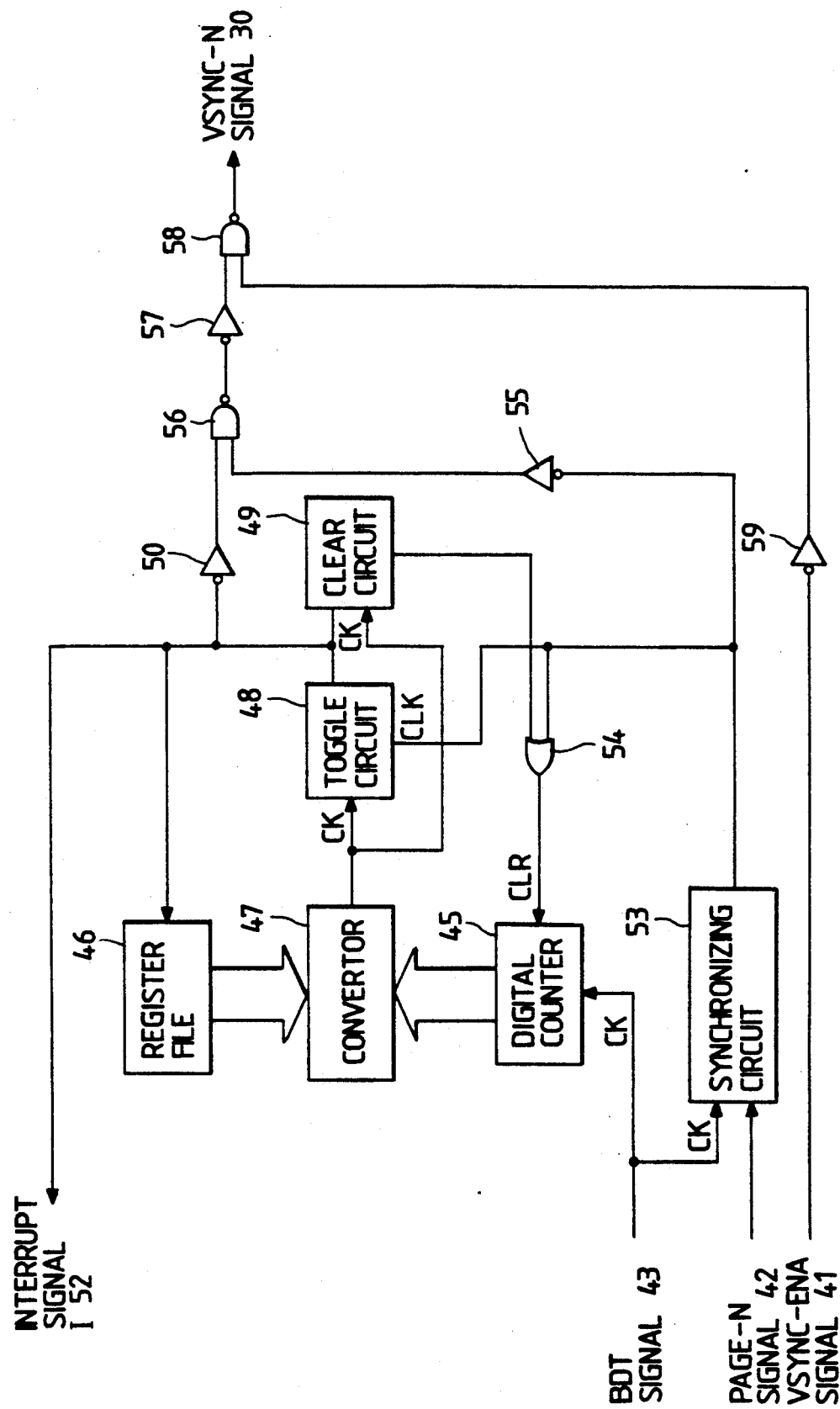
FIG. 6 is a control circuit block diagram of the color laser beam printer according to the present invention.

FIG. 6 is a block diagram showing the control circuit of the color laser beam printer in the embodiment according to the present invention. Each of block will be explained as follows.

A digital counter 45 is an accumulation counter which is driven by the beam detection (BDT) signal 43. The digital counter 45 has a clear terminal. The clear terminal of the digital counter 45 is made the output to "0" ("Low" level) during "High" level is input into the clear terminal.

A resistor file 46 stores the number data of the beam detection (BDT) signal 43 corresponding to the scanning time of the area (1) and the area (2) of the printing area signal AREA-N 40. When "Low" level is input to the input terminal, the information of the area (1) is output, and when "High" level is input to the input terminal, the information of the area (2) is output.

A convertor 47 compares the output of the digital counter 45 with the output of the resistor file 46. The converter 47 generates the output pulse when the output of the digital counter 45 agrees with the output of the resistor file 46. The output pulse of the converter 47 is input into a toggle circuit 48.

The toggle circuit 48 reverses the output condition every input of the clock signal. The toggle circuit 48 has the clear terminal and this clear terminal of the toggle circuit 48 is made the output to "0" ("Low" level) during "High" level is input into the clear terminal. The output of the toggle circuit 48 is input to NAND element (a) 56 through a clear circuit 49 and the resistor file 46 and the invertor element (a) 50. The toggle circuit 48 input a rise edge of the output to CPU 29 as the interrupt signal I 52.

When the clear circuit 49 output "High" level having a certain time width when the input is "High" level the clock signal is input in the clear circuit 49 and the output of "High" level is input into the clear terminal of the digital counter 45 through OR element 54. The certain time width of "High" level is a time for clearing sufficiently the digital counter 45.

A synchronizing circuit 53 output the information which is given to one side of the input with another side of the clock signal input rise edge. The synchronizing circuit 53 carries out to synchronize the input information with the clock signal. The synchronizing circuit 53 carries out to synchronize the beam detect (BDT) signal with the write-out page signal PAGE-N 42.

The output of the synchronizing circuit 53 enters into OR element 54 for outputing "High" level when one of the input is "High" level. Accordingly, the information is transmitted directly from OR element and enters the clear terminal of the digital counter 45 and the clear terminal of the toggle circuit 48.

Further, the information is mate to enter into the invertor element (b) 55 which has the function for reversing the input condition and the output condition. The invertor element (b) 55 reverses the condition and the reversed condition is input to NAND element (b) 56.

NAND element (b) 56 output "Low" level when both input are "High" level. The output of NAND element (b) 56 is input into NAND element (b) 58 thought the invertor element (c) 57. In another input terminal of NAND element (b) 58, the vertical synchronizing effective signal VSYNC-ENA 41 is input through the invertor element (d) 58.

Next, the printing motion of the color laser beam printer according to the present invention will be explained as follows. When there is the printing requirement from the image data generating means 1, the color laser beam printer 2 starts the printing motion.

And CPU detests the photosensitive body belt sensor (b) 39(*b*), the vertical synchronizing effective signal VSYNC-ENA 41 is risen in the first place before the time tm and it is made effective the invertor element (d) 58. In this time, another input presents the initial condition having "Low" level.

Next, after the lapse of the time tm, the write-out page signal PAGE-N 42 is risen. In this time, the synchronizing circuit 53 synchronizes the write-out page signal PAGE-N 42 with the beam detection (BDT) signal and the clear of the digital counter 45 and the clear of the toggle circuit 48 is released. Then it can make possible for the motion and one of the input of NAND element (a) 56 is made "High" level.

In this time, the output of the digital counter 45 and the output of the toggle circuit 48 are "Low" level, accordingly another input of NAND element (a) 56 becomes "High" level and the output is made "Low" level. In succession, similarly NAND element (b) 58 becomes "Low" level and the vertical synchronizing signal VSYNC-N(a or b) (Y) for yellow color in the first place color is sent out.

Further, since the input of the resistor file 46 is "Low" level, as the output the value of the area (1) comes out. The digital counter 45 continues to count up and when the count-up number of the digital counter 45 agrees with the value of the area (1) of the resistor file 46 the clock signal is generated and the condition of the toggle circuit 48 is reversed "High" level.

According to the above, each of the output of NAND element (a) 56 and the output of NAND element (b) 58 becomes respectively "High" level, the sending-out of the vertical synchronizing signal VSYNC-N(a or b) (Y) for yellow color in the first place color is finished. Further, since the input of the resistor file 46 becomes "High" level, as the output the value of the area (2) is output.

Since the output of the toggle circuit 48 is connected to CPU 29 as the interrupt signal, in accordance with the rise edge of this signal the condition of the image data generating means 1 is searched.

When supposing that the sending-out of the vertical synchronizing signal VSYNC-N 30 is unnecessary, in such an above case the vertical synchronizing effective signal VSYNC-ENA 41 is made to rise and the output of NAND element (b) 58 is made "High" level and is made ineffective, accordingly the processing of the kind (b) shown in FIG. 5 can be attained.

In this time, the digital counter 45 carries out to count up continuously. And when the value agrees with the value of the area (2), the clock signal is generated again from the comparator 47 and the condition of the toggle circuit 48 is reversed again to "Low" level. Then the succeed NAND element is made again at "Low" level and the vertical synchronizing signal VSYNC-N(a or b) (M) for magenta color in the second place color is sent out.

Further, in accordance with the fall edge from this toggle circuit 48 the clear circuit is operated and the digital counter 45 is cleared and the output of the digital counter 45 becomes "0" and it is made the condition in which the digital counter 45 counts up again from "0". Needless to say, from the resistor file 46 the value of the area (1) is output.

According to the above stated operation, the area (1) and the area (2) are generated repeatedly and the vertical synchronizing signal VSYNC-N(a or b) (C) for cyan color in the third place color and the vertical synchronizing signal VSYNC-N(a or b) (B) for black color in the fourth place color are sent out.

When the processing for the first page has been finished, the write-out page signal PAGE-N 42 is risen to "High" level. In this time, the digital counter 45 and the toggle circuit 48 are put at the clear condition and the output of the digital counter 45 and the output of the toggle circuit 48 are fixed at "Low" level, respectively. Further, NAND element (a) 56 is made "Low" level, the vertical synchronizing signal VSYNC-N 30 becomes "High" level and is made ineffective.

When the printing motion is carried out continuously the second page, it detects again the photosensitive body drum sensor signal (b) 39(b) and carries out similarly the processing, such a case the sending-out of the vertical synchronizing signal VSYNC-N 30 can carry out continuously.

We claim:

1. A color image electrophotographic apparatus having a photosensitive body and an intermediate transfer body comprising:
   an image data generating means for generating an image data as a video signal;
   a control means for lighting on or lighting off a laser beam which is modulated according to said video signal generated from said image data generating means;
   an exposure means for deflecting and scanning said laser beam toward a width direction of a recording medium by a rotary polygon mirror;
   a light detection means for generating a printing synchronizing signal by detecting said scanning laser beam which passes through a predetermined position;
   a photosensitive body in which an electrostatic latent image is formed by exposing said exposure means;
   a set of development means for forming a toner image on a surface of said photosensitive body by developing said electrostatic latent image formed on said photosensitive body;
   a recording medium transporting means for transporting said recording medium;
   an intermediate transfer body for transferring once said toner image; and
   a control means for controlling each of the above stated means, said control means controls said above stated means in which by repeatedly rotating a plural time said photosensitive body and by controlling said exposure means in accordance with said image data given by said image data generating means said electrostatic latent image for forming repeatedly said toner image having a different color each on said photosensitive body, said toner image having said different color is formed according to developing said electrostatic latent image, said toner image is repeatedly transferred on said intermediate transfer body, a color image is formed on said intermediate transfer body, and after that said color image is transferred collectively on said recording medium;
   wherein said color image electrophotographic apparatus comprises further:
   a passing-through detection means for detecting a specific portion of said photosensitive body; and
   an image data requirement signal generating means for controlling a generating timing of an image requirement signal for forming said toner image,
   wherein an outer peripheral length of said intermediate transfer body is such that a number of times a printing synchronizing signal is produced during one rotation of said intermediate transfer body is an integer multiple of a number of faces of said rotary polygon mirror,
   said passing-through detection means is provided at a predetermined position on said photosensitive body, and
   said image data requirement signal generating means controls said generating timing of said image requirement signal in accordance with a passing-through detection signal obtained by said passing-through detection means and a selected number of times said printing synchronizing signal has been produced, thereby enabling a position of said toner image on said intermediate transfer body to be controlled by specifying said selected number of times said printing synchronizing signal has been produced.

2. A color image electrophotographic apparatus according to claim 1,
   wherein said image data requirement signal generating means generates said image data requirement signal for forming said toner image in accordance with a just before passing-through detection signal for generating a first place color of a first page of said image data requirement data from said first place color of said first page to a final place color of said first page, and
   similar to an image data requirement signal generating means for a next page, said image data requirement signal generating means controls to generate said image data requirement signal for forming said toner image in accordance with a just before passing-through detection signal for generating a first place color of said next page.

3. A color image electrophotographic apparatus according to claim 1,
wherein in a case a voluntary color of said image data is not transferred from said image data generating means, said image data requirement signal generating means does not generate said image data requirement signal for said voluntary color into said image data generating means.

4. A color image electrophotographic apparatus according to claim 1, in which said color image electrophotographic apparatus comprises further a drive means for driving said intermediate transfer body and a drive means for driving said rotary polygon mirror,
wherein a clock signal of said intermediate transfer body drive means and a clock signal of said rotary polygon mirror drive means are derived from the same basic clock signal.

5. A color laser beam printing apparatus having a photosensitive body belt and an intermediate transfer drum comprising:
an image data generating means for generating an image data as a video signal;
a control means for lighting on or lighting off a laser beam which is modulated according to said video signal generated from said image data generating means;
an exposure means for deflecting and scanning said laser beam toward a width direction of a printing paper by a rotary polygon mirror;
a light detection means for generating a printing synchronizing signal by detecting said scanning laser beam which passes through a predetermined position;
a photosensitive body belt in which an electrostatic latent image is formed by exposing said exposure means;
a set of development means for forming a toner image on a surface of said photosensitive body belt by developing said electrostatic latent image formed on said photosensitive body belt;
a printing paper transporting means for transporting said printing paper;
an intermediate transfer drum for transferring once said toner image; and
a control means for controlling each of the above stated means, said control means controls said above stated means in which by repeatedly rotating a plural times said photosensitive body belt and by controlling said exposure means in accordance with said image data given by said image data generating means said electrostatic latent image for forming repeatedly said toner image having a different color each on said photosensitive body belt, said toner image having said different color is formed according to developing said electrostatic latent image, said toner image is repeatedly transferred on said intermediate transfer drum, a color image is formed on said intermediate transfer drum, and after that said color image is transferred collectively on said printing paper;
wherein said color laser beam printing apparatus comprises further:
a passing-through detection means for detecting a specific portion of said photosensitive body belt; and
an image data requirement signal generating means for controlling a generating timing of an image requirement signal for forming said toner image,
wherein an outer peripheral length of said intermediate transfer drum is such that a number of times a printing synchronizing signal is produced during one rotation of said intermediate transfer drum is equal to an integer multiple of a number of faces of said rotary polygon mirror,
said passing-through detection means is provided at a predetermined position on said photosensitive body belt, and
said image data requirement signal generating means controls said generating timing of said image requirement signal in accordance with a passing-through detection signal obtained by said passing-through detection means and a selected number of times said printing synchronizing signal has been produced, thereby enabling a position of said toner image on said intermediate transfer drum to be controlled by specifying said selected number of times said printing synchronizing signal has been produced.

6. A color laser beam printing apparatus according to claim 5,
wherein said image data requirement signal generating means generates said image data requirement signal for forming said toner image in accordance with a just before passing-through detection signal for generating a first place color of a first page of said image data requirement data from said first place color of said first page to a final place color of said first page, and
similar to an image data requirement signal generating means for a next page, said image data requirement signal generating means controls to generate said image data requirement signal for forming said toner image in accordance with a just before passing-through detection signal for generating a first place color of said next page.

7. A color laser beam printing apparatus according to claim 5,
wherein in a case a voluntary color of said image data is not transferred from said image data generating means, said image data requirement signal generating means does not generate said image data requirement signal for said voluntary color into said image data generating means.

8. A color laser beam printing apparatus according to claim 5, in which said color laser beam printing apparatus comprises further a drive means for driving said intermediate transfer drum and a drive means for driving said rotary polygon mirror,
wherein a clock signal of said intermediate transfer drum drive means and a clock signal of said rotary polygon mirror drive means are derived from the same basic clock signal.

9. A color laser beam printing apparatus according to claim 5,
wherein said photosensitive body belt has a joint portion, and said passing-through detection means is provided at a front side against said joint portion of said photosensitive body belt toward in a rotation direction of said photosensitive body belt.

* * * * *